United States Patent [19]

Crossley

[11] 3,961,027

[45] June 1, 1976

[54] CYCLIC PROCESS FOR RE-USE OF WASTE WATER GENERATED DURING THE PRODUCTION OF $UO_2$

[75] Inventor: Thomas J. Crossley, Chapin, S.C.

[73] Assignee: Westinghouse Electric Corporation, Pittsburgh, Pa.

[22] Filed: Oct. 18, 1973

[21] Appl. No.: 407,722

[52] U.S. Cl. .................................. 423/6; 423/7; 423/11; 423/15; 252/301.1 W
[51] Int. Cl.² ..................... C01G 43/02; C02B 1/46
[58] Field of Search .................... 423/6, 7, 4, 15; 252/301.1 W

[56] References Cited
UNITED STATES PATENTS

| | | | |
|---|---|---|---|
| 3,188,169 | 6/1965 | Kraus et al. | 423/7 |
| 3,394,997 | 7/1968 | Hollander | 423/15 X |
| 3,758,280 | 9/1973 | Pirk et al. | 423/15 |
| 3,842,155 | 10/1974 | Muller et al. | 423/253 X |

*Primary Examiner*—Leland A. Sebastian
*Assistant Examiner*—Edward A. Miller
*Attorney, Agent, or Firm*—R. T. Randig

[57] ABSTRACT

Waste water containing large amounts of fluorides and ammonia and trace amounts of uranium, as is produced during the hydrolysis and ammonium hydroxide treatment of uranium hexafluoride ($UF_6$) to produce ammonium diuranate (ADU) therefrom, is rendered suitable for cyclic reuse by initially treating the waste water with sufficient lime to precipitate substantially all of the fluorides present in the waste water to a relatively insoluble $CaF_2$ precipitate, the treated solution is subjected to distillation to drive off ammonia for reuse in the ADU precipitation, the $CaF_2$ precipitate is separated from the aqueous distilland leaving water with dissolved calcium, the distilland is treated by a cationic ion-exchange material to remove substantially all of the calcium and other cationic metal impurities and the resulting water containing small amounts of uranium, fluoride and ammonia is recycled to react with $UF_6$ or to be combined with the ammonium hydroxide distillate and then treated with additional concentrated ammonium hydroxide to form a solution of the desired $NH_3$ content for use in precipitating ADU. This recycling is most important for ecological reasons, and for cost improvement, as well as health and safety purposes.

7 Claims, 1 Drawing Figure

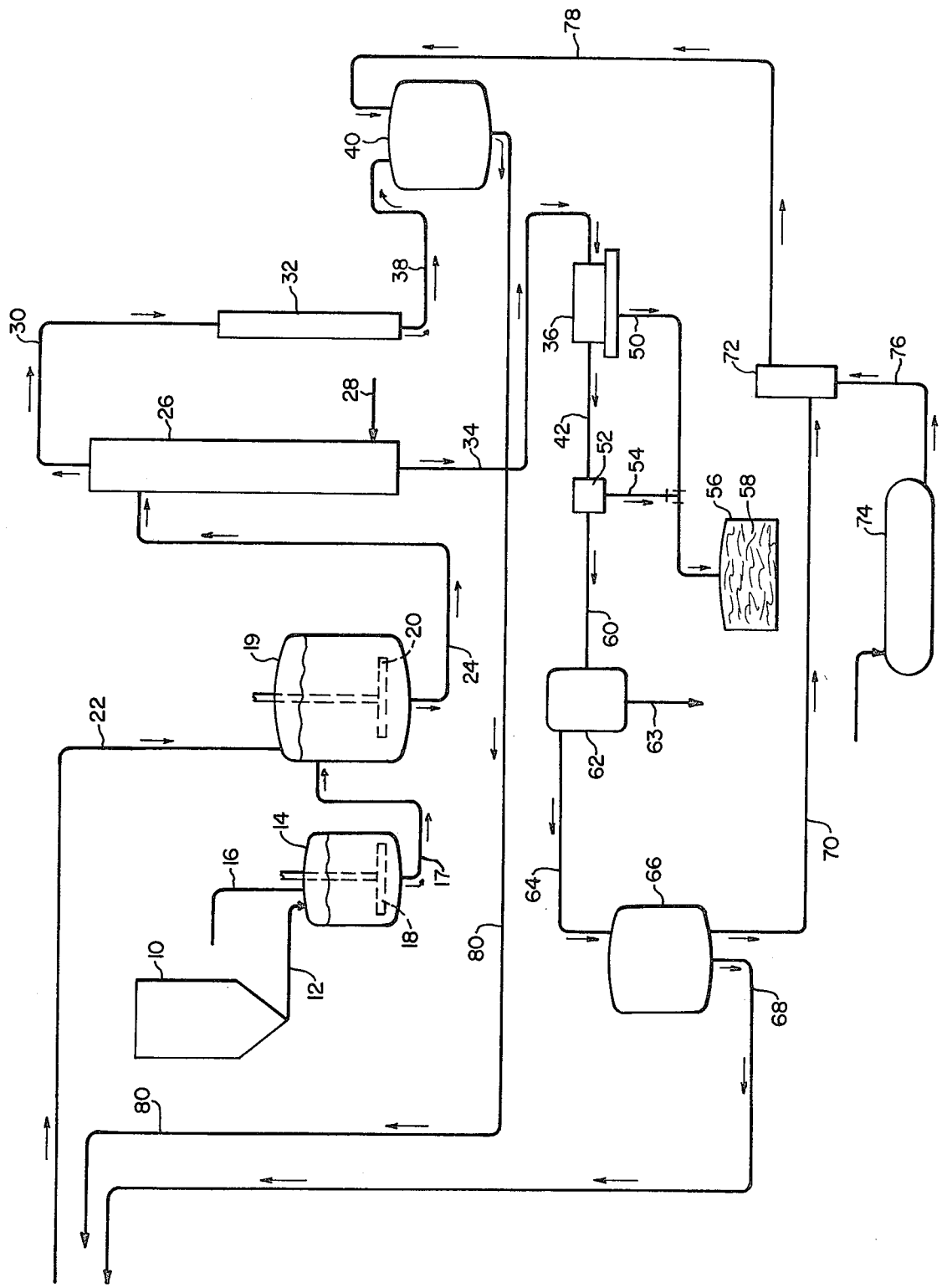

CYCLIC PROCESS FOR RE-USE OF WASTE WATER GENERATED DURING THE PRODUCTION OF $UO_2$

BACKGROUND OF THE INVENTION

1. Field of the Invention

This invention relates to the recycling and reuse of water with ammonium compounds and traces of uranium as is produced by the hydrolysis of $UF_6$ and subsequent treatment with ammonia to precipitate ADU. There is substantially no loss of uranium by reason of such reuse, the problems of the disposal of the waste water with its toxic fluoride and radioactive materials, are avoided.

2. Description of the Prior Art

In preparing fuel elements for nuclear reactors it is desirable to employ $UO_2$ for this purpose. A widely used method is to process $UF_6$ to prepare ADU which is then calcined and reduced to $UO_2$. In preparing ADU, enriched $UF_6$ gas is reacted with water to produce an aqueous uranyl fluoride ($UO_2F_2$) solution which is then treated with an excess of ammonium hydroxide to cause a precipitate of ADU which is recovered as an aqueous slurry. The precipitate can be filtered out or centrifuged from the aqueous phase of the slurry. The resulting waste water contains a high concentration of fluorides, primarily as $NH_4F$, with excess ammonia, and small quantities of dissolved uranium.

The disposal of this waste water entails considerable problems and difficulty because of the toxicity of the fluorides as well as the excess ammonia and the small but significant quantities of radioactive uranium. On both ecological and health accounts it would be highly desirable to eliminate or greatly reduce this disposal problem, as well as to recover from the waste water substantially entirely the traces of enriched uranium, which latter is a very costly material as well as being a health hazard.

U.S. Pat. No. 3,726,650 to Welty and U.S. Pat. No. 3,758,664, disclose processes for producing ADU from $UF_6$, and their teaching is incorporated herein. They show that for each 100 pounds of $UF_6$ converted to ADU, there is produced from between 680 to 3311 pounds of waste water solution containing approximately some 63 pounds of $NH_4F$ and 24.8 pounds of $NH_4OH$.

The Hollander U.S. Pat. No. 3,394,997 also discloses processes for converting $UF_6$ to ADU and for reclaiming some of the waste water. In this patent, an ion exchange column is employed first to recover any ADU. Then lime is applied to the waste water, in an amount of not less than required to stoichiometrically precipitate all of the fluorides. Calcium dissolved in the water remains in the system and if reused would be carried over into the ADU process where it is not desired. Even so, some 525 pounds of waste water from thickener 40 in U.S. Pat. No. 3,394,997 must go to radioactive waste burial. The shortcomings and difficulties, however, in this patent process are that substantial amounts of calcium are present in the thickener overflow going to the ammonia recycle. It is important that practically no calcium be present in the water to be reacted with $UF_6$. Also in this patent process there are a large number of process steps for treating the waste water which are costly, requiring both extra equipment with added maintenance and service problems.

SUMMARY OF THE INVENTION

In accordance with this invention it has been found that the foregoing problems may be overcome, and at a low cost, by treating the waste water resulting when ADU precipitate is separated from the aqueous component of the slurry in which it is present, as follows:

1. Admixing the waste water with sufficient lime to cause substantially all of the fluoride to form a calcium fluoride precipitate.
2. Distilling off nearly all of the ammonia from this treated water containing $CaF_2$ precipitate, condensing the ammonia and recycling it to the $UO_2F_2$ treatment vessel.
3. Centrifuging the calcium fluoride precipitate slurried in the substantially ammonia free water to separate it from substantially all of the water to produce a small quantity of a non-toxic, essentially uranium free, pasty $CaF_2$ product that can be employed in glass manufacturing or for making hydrofluoric acid, or can be safely disposed of by burial.
4. After passing the water from the centrifuge through a polishing filter to remove the final traces of suspended solids, the water is passed through cationic ion-exchange beds to remove substantially all of the calcium and all of the impurities except for small amounts of ammonia and fluorides whereby to produce water of required purity that is recycled to either The $UF_6$ gas-water reaction area or to the ammonium hydroxide preparation and storage areas.

BRIEF DESCRIPTION OF THE DRAWING

The single FIGURE of the drawing is a schematic flow sheet of an embodiment of the invention.

DETAILED DESCRIPTION OF THE PREFERRED EMBODIMENT

In accordance with the present invention, there is treated and recovered for cyclic reuse substantially all of the waste water resulting from the separation of an ADU precipitate from the aqueous medium in which it is formed and then suspended. The ADU preparation process used may be the one set forth in U.S. Pat. No. 3,758,664 or U.S. Pat. No. 3,726,650, for example, by dissolving $UF_6$ in water wherein they react to produce $UO_2F_2$ and HF, then adding an excess of $NH_4OH$ of a suitable concentration in one or more stages to neutralize the HF and to react with the $UO_2F_2$ to form the ADU precipitate and $NH_4F$ dissolved in the water. A widely used process to separate the ADU is shown in the above-identified pending application and issued U.S. patent, which process comprises passing the slurry of the ADU precipitate through a centrifuge to produce one stream comprising (a) a sludge of from 35 to 60% ADU and the balance water, and (b) a second stream comprising a large volume of waste water with dissolved $NH_4F$, $NH_4OH$ and traces of uranium.

For every 100 pounds of $UF_6$ reacted there is produced as an end product some 88.6 pounds of ADU with from about 59 to 164 pounds of water present so as to provide a flowable, putty-like sludge which is conveyed to a calciner to be heated to drive off the water and reduced with hydrogen and steam to $UO_2$. There is also produced a quantity of from as little as 680 pounds and up to about 2000 to 4100 pounds or more of waste water. The disposal of this volume of waste water by the ordinary means, with its substantial fluoride and ammonia content, constitutes a serious ecological problem. Because of the traces of uranium therein, an even more difficult disposal problem arises due to its radioactivity. These potentially troublesome and costly disposal problems have been effectively solved and, for all practical purposes, almost completely eliminated by the process of this invention.

Referring to the drawing, from a tank 10 containing hydrated lime [$Ca(OH)_2$], measured quantities of lime are conveyed by a screw conveyor lime 12, to a lime slurry tank 14. If desired, the lime is weighed out in batches and then conveyed to tank 14. Sufficient water to produce an aqueous slurry is added from pipe 16 by suitable control valve operation. Though hydrated lime is easier to handle and use, it will be understood that calcium oxide or other reactive alkali earth metal compounds can be employed. Since commercial hydrated lime contains various impurities, such as magnesium compounds, aluminum compounds, silica, and some iron compounds, it is desired to employ the purer available limes containing less than 5 percent of impurities. Magnesium fluoride is only slightly more soluble than calcium fluoride and it can be tolerated better than other impurities. There are readily available hydrated limes having a combined total of over 98 percent calcium and magnesium hydroxide. A uniform slurry of from 2 to 20 pounds of lime per 100 pounds of water may be prepared in tank 14 by action of the stirrer 18 as weighed amounts of lime and water are added.

Into a tank 19 provided with a stirrer 20, there is conveyed via pipe 22 waste water from the ADU centrifuge. After a weighed amount of the waste water, at a pH of about 9.5, has been added, a predetermined amount of the lime slurry in tank 14 is pumped by line 16 into vessel 19 so as to provide a slight excess of calcium (and magnesium) hydroxide over that required to react with all of the fluoride in the waste water brought by pipe 22 from the ADU centrifuge. For every 74 pounds of $NH_4F$, in, for example, 3900 pounds of waste water, there is introduced slightly over 74 pounds of lime in the slurry. For a slurry of 15 pounds of lime in 100 pounds of water, some 575 pounds of slurry, plus a slight excess, is required to react with and precipitate all of the fluoride.

It is not necessary to add the stoichiometric amount or slightly more of lime to react with all of the fluorides in the waste water. An amount of lime slightly below the stoichiometric quantity, for example, 1 to 5 percent less, is acceptable since a small portion of fluoride can be present in the treated water when recycled without harm.

After a thorough mixing by operation of stirrer 20 so as to cause a thorough and complete reaction of the lime slurry with the fluorides in the waste water, and so that large crystals of calcium fluoride are formed, the slurry in vessel 19 is pumped via pipe 24 to a distillation column 26 wherein live steam from a conduit 28 is introduced to cause ammonium hydroxide plus steam to vaporize and pass by pipe 30 to a condenser 32 where it is cooled and condensed to, for example, 25% $NH_4OH$ solution, which solution is conveyed by pipe 28 to an ammonia storage tank 40.

From the bottom of still 26, the still residue comprising calcium fluoride precipitate alaong with some undissolved lime and impurity particles, all suspended in water, is conveyed to a centrifuge 36 wherein one stream output is a sludge or paste of calcium fluoride plus some calcium hydroxide and impurity solids with small amounts of water is carried by line 50 as solids waste 56 to a waste receptacle 58.

It is feasible to remove the calcium fluoride and other residues from the waste water before distillation, since some ammonia is lost, and it is preferable to distill off the ammonia before centrifuging off the precipitates.

The liquid stream from separator 36 is conveyed by a pipe 42 to a polishing filter 52 in order to remove the last traces of any fine suspensions therefrom. The small volumes of solids from filter 52 is also conveyed by a line 54 to the solids waste receptacle 58. Since practically no uranium is present in the waste solids 56 is it suitable for use in applications calling for calcium fluoride — for example, in glass making.

The clarified water effluent from filter 52 comprises some 200 milligrams per liter of free ammonia, not over 50 milligrams per liter of fluoride, calcium and magnesium and other soluble impurities, as well as practically all of the traces of dissolved uranium originally brought in by pipe 22. This water is carried by a line 60 to a cation ion-exchange column 62 which absorbs the calcium, magnesium, iron and other metal impurities and preferably exchanges hydrogen for these metals. If desired, a second ion exchange unit may be used to remove anions particularly chlorides. Calcium is particularly undesirable in producing ADU. The ion exchange resin can be regenerated and the cations are removed, via pipe 63 to an acid-treatment tank for regeneration and reuse. Suitable cationic exchange resins are the well known sulfonic acid treated divinyl benzene-styrene copolymers.

The relatively pure water with a small portion of ammonia, produced by the ion exchange column 62 is conveyed by pipe 64 to a water storage vessel 66 where it may be piped by a line 68 to the $UF_6$ dissolving vessel, or to the lime slurry tank 18, or by a pipe 70 to an ammonia make-up tank 72 wherein concentrated ammonia shipped in and stored in a tank 74, is also conveyed by pipe 76 and the two are combined in suitable proportions to produce the proper concentration of 24–29% $NH_3$ to use in the ADU precipitation step. Any small amounts of fluorine in the water in tank 66 is not objectionable. The minute traces of uranium in this water in fact, is desirably present so that it is not wasted.

Thus it will be seen that, outside of calcium fluoride solids which are commercially soluble and usable, the waste water from the ADU process is all recovered and recycled whereby to avoid difficult disposal problems.

Utilizing the waste water treatment procedures of this invention wherein treated waste water is recycled for use in converting more $UF_6$ into ADU, no water need be added, or at most only small make-up additions need be made to the system. The only water losses from the system are in the ADU sludge going to the calciners and in the $CaF_2$ sludge, both taking relatively small quantities of water. This last amount of water loss can be very nearly compensated for by the water in the additional aqueous ammonia brought in to replace the ammonia present in the ADU. Consequently, no waste water need be disposed of or discarded.

I claim:

1. In the process of treating waste water from a system wherein $UF_6$ is hydrolyzed and reacted with ammonium hydroxide to produce ADU, the waste water containing $NH_4F$, $NH_4OH$ and traces of uranium, whereby both ammonium hydroxide is recovered from the waste water and the waste water is purified excepting for the traces of uranium for recycling with more $UF_6$, the steps comprising adding calcium hydroxide to the waste water in a slight stoichiometric excess to react with all of the fluorides in the waste water to produce a precipitate of $CaF_2$, distilling the waste water to recover ammonium hydroxide therefrom, removing the $CaF_2$ precipitate from the treated waste water, passing the remaining waste water through a cation ion-exchange column to remove substantially all of the calcium and other cationic metal impurities from the added calcium hydroxide, the cation ion-exchange treated water containing the traces of uranium and the treated water being suitable for recycling to the $UF_6$ hydrolysis step and elsewhere in the process.

2. In the process of producing ammonium diuranate (ADU) from an aqueous solution containing $UF_6$ dissolved therein and wherein an excess of ammonium hydroxide is admixed with the aqueous solution of $UF_6$ to precipitate ADU which is thereafter separated from the aqueous solution leaving a large volume of waste water containing $NH_4F$, $NH_4OH$ and small amounts of uranium, the improvement of steps comprising adding a slight stoichiometric excess of an alkaline earth metal compound which is capable of reacting to form alkali earth metal fluoride precipitate of low solubility in the treated waste water, distilling the aqueous waste water to volatilize the ammonium hydroxide therefrom and condensing the distillate for reuse in treating more aqueous $UF_6$ solutions, separating the alkali earth metal fluoride precipitate from the waste water in one or more steps, contacting the aqueous residue with an cationic ion exchange resin to remove the alkali earth metal and other cationic metal impurities from the added alkaline earth compound therefrom, and recirculating the so treated water, said treated water being suitable for recycle, including dissolving more $UF_6$ and producing more ammonium hydroxide solution.

3. The process of claim 2 wherein the alkali earth metal compound is calcium hydroxide.

4. The process of claim 2, wherein the ion exchange treatment comprises an ion exchange material that exchanges hydrogen for calcium.

5. The process of claim 2 wherein the alkaline earth metal compound is added in a stoichiometric amount or slightly less than is required to react with all of the fluorides.

6. The process of claim 1, wherein the calcium fluoride precpitate is removed from the aqueous portion of the waste water before distillation of the ammonia from the aqueous portion.

7. The process of claim 2 wherein the alkali earth metal compound comprise lime.

* * * * *